United States Patent
Matthias et al.

(10) Patent No.: US 8,951,662 B2
(45) Date of Patent: Feb. 10, 2015

(54) ENERGY STORAGE PACK FOR AN ELECTRIC POWER TOOL, AND ELECTRIC POWER TOOL

(75) Inventors: Wolf Matthias, Stuttgart (DE); Rainer Glauning, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 13/231,445

(22) Filed: Sep. 13, 2011

(65) Prior Publication Data

US 2012/0082885 A1 Apr. 5, 2012

(30) Foreign Application Priority Data

Sep. 30, 2010 (DE) .......................... 10 2010 041 765

(51) Int. Cl.
*H01M 2/30* (2006.01)
*H01M 2/20* (2006.01)

(52) U.S. Cl.
CPC .............. *H01M 2/30* (2013.01); *H04M 2/1022* (2013.01); *H01M 2/204* (2013.01)
USPC .......................... 429/170; 429/121; 429/178

(58) Field of Classification Search
CPC ................................ H01M 2/20; H01M 2/202
See application file for complete search history.

(56) References Cited

U.S. PATENT DOCUMENTS

| | | | |
|---|---|---|---|
| 2003/0127932 A1* | 7/2003 | Ishida et al. | 310/184 |
| 2006/0071636 A1* | 4/2006 | Phillips et al. | 320/112 |
| 2008/0102712 A1* | 5/2008 | Giefers | 439/733.1 |
| 2011/0147031 A1 | 6/2011 | Matthias et al. | |

FOREIGN PATENT DOCUMENTS

DE 102008040061 1/2010

* cited by examiner

*Primary Examiner* — Ula C Ruddock
*Assistant Examiner* — Scott J Chmielecki
(74) *Attorney, Agent, or Firm* — Kenyon & Kenyon LLP

(57) ABSTRACT

An energy storage pack for an electric power tool comprising a housing for reception of a plurality of cell blocks having electrochemical storage cells, as well as electrical pole terminals to which poles of the cell blocks are electrically connectable. At least one pole terminal is embodied as a subassembly that encompasses two electrically separated contacts.

15 Claims, 4 Drawing Sheets

ENERGY STORAGE PACK FOR AN ELECTRIC POWER TOOL, AND ELECTRIC POWER TOOL

CROSS REFERENCE

The present application claims the benefit under 35 U.S.C. §119 of German Patent Application No. DE 102010041765.3, filed on Sep. 30, 2010, which is expressly incorporated herein by reference in its entirety.

FIELD OF THE INVENTION

The present invention relates to an energy storage pack for an electric power tool and a battery-driven electric power tool having a contact apparatus for connection of at least one energy storage pack.

BACKGROUND INFORMATION

Manufacturers of electric power tools usually offer different battery packs of different physical sizes and rated voltages, each battery pack being allocated, in terms of its physical size, rated voltage, and/or power level, to a specific model of electric power tool. It is also usual to offer different types of battery, for example NiCd batteries, nickel/metal hydride (NiMH) batteries, and lithium-ion (Li-ion) batteries. Li-ion batteries are particularly widely used because of their high power density. The rated voltage and capacity of the particular battery packs that are used or available generally determine the power level and running time of the electric power tools.

Electric power tools that require a large amount of energy and in which very high power peaks may also be briefly necessary, for example large angle grinders or chainsaws, cannot, however, be operated efficiently using presently available battery packs. In addition, particular rules regarding transportation safety and handling exist for Li-ion batteries once a certain capacity is exceeded. The profitability of such large Li-ion battery packs is thereby disadvantageously influenced.

German Patent Application No. DE 10 2008 040 061 A1 describes an electric power tool, having a network-independent power supply, in which operation at high energy consumption with large power peaks and an extended running time is efficiently possible using presently available battery packs. The electric power tool encompasses an interface by which the electric power tool is mechanically and electrically connectable to a battery pack. Provided for this purpose is a coupling apparatus that is mechanically and electrically connectable, via the interface, to the electric power tool. The coupling apparatus has a first battery interface for connection to a first battery pack, and a second battery interface for connection to a second battery pack. The electric power tool can be operated selectably using a single battery pack, two battery packs electrically connected in parallel, or two battery packs electrically connected in series.

SUMMARY

In accordance with an example embodiment of the present invention, an energy storage pack for an electric power tool is provided, having a housing for reception of a plurality of cell blocks having electrochemical storage cells, as well as electrical pole terminals to which electrical poles of the cell blocks are electrically connectable.

At least one pole terminal may be embodied as a subassembly that encompasses at least two electrically separated contacts. Cell blocks of electrochemical storage cells can be connected to each of the electrically separated contacts. During operation of the energy storage pack, the separated contacts are electrically combined so that the previously separately connected cell blocks are now connected together and have a correspondingly higher energy content than the separate cell blocks.

Two or more lower-power cell blocks can thus be used to operate electric power tools that require higher-power energy storage packs. In this context, the term "electric power tool" is not limited to handheld electric tools but also encompasses, for example, garden devices such as lawnmowers or benchtop systems such as large stationary saws.

The energy storage pack can be, in particular, a battery pack having a plurality of cell blocks having rechargeable electrochemical storage cells. A plurality of cell blocks within the meaning of the present invention includes at least two cell blocks and, for instance, three or four cell blocks. A cell block includes a plurality of rechargeable electrochemical storage cells, a plurality including at least two storage cells. The storage cells are connected in series and/or in parallel in a cell block.

Advantageously, the subassembly can be embodied to be electrically connectable when in contact as intended with a complementary pole terminal. In particular, the subassembly can be embodied as a plug connector of a plug/socket connection in such a way that the latter is electrically connectable when in contact with its complementary plug connector. This has the advantage that within a housing it is possible to dispose multiple cell blocks for which an interconnection can be created with an existing contact system in such a way that the latter is compatible, in terms of the electric power tool and the charger, with existing smaller energy reservoirs.

In a further advantageous refinement, the housing can have two pole terminals that are each embodied as a subassembly, each subassembly encompassing two electrically separated contacts. It is useful here if at least two cell blocks, which are electrically separated from one another and constitute independent energy reservoirs, are connected to each contact. Only upon insertion into an electric power tool or into a charger does the corresponding complementary contact make contact with both parts of the respective subassembly, and electrically connect the two cell blocks together. What thereby results is an energy storage pack having a greater energy content. This is advantageous in particular in the context of battery packs based on Li-ion technology.

In a further advantageous refinement, each contact of the subassembly can be connected to at least two identical-polarity poles of the cell blocks. It is thus possible to make contact, for example, to two times two cell blocks.

Usefully, the pole terminals can be embodied as tulip contacts. This enables simple simultaneous contacting of separate contacts of a subassembly.

In a further useful refinement, the tulip contacts can be divided longitudinally parallel to a longitudinal axis and/or to a vertical axis of the tulip contact. The vertical axis is disposed perpendicular to the longitudinal axis. A division of the tulip contacts can thus be performed perpendicular to the vertical axis of the contact tongue of the complementary mating contact and/or parallel thereto. In the case of a division parallel to the longitudinal axis and to the vertical axis, the division extends parallel to the vertical axis of the contact tongue. In the case of a division parallel to the longitudinal axis and perpendicular to the vertical axis, the division extends perpendicular to the vertical axis of the contact tongue. A cell block can be connected to each spring contact pair, or indeed to each individual spring of a spring contact pair.

In the case of a division parallel to the longitudinal axis and to the vertical axis, the at least two electrically separated contacts of each tulip contact can, for example, constitute one tulip contact. This is easy to achieve in terms of production engineering, and enables simple connection to complementary mating contacts.

In accordance with an example embodiment of the present invention, a housing for an energy storage pack is provided. Contact positions for poles of cell blocks having electrochemical storage cells can advantageously be provided in the interior, which contact positions are connected in electrically conductive fashion to one another in such a way that at least two identical-polarity poles are guidable to a housing-side pole terminal which is embodied as a subassembly that encompasses two electrically separated contacts.

Advantageously, individual cell blocks can be slid into the housing. It is only when a connection is made, for example, to an electric power tool or to a charger that the cell blocks in the housing themselves represent a energy reservoir having a higher power level than the individual cell blocks.

In accordance with an example embodiment of the present invention, an electric power tool is provided having a contact apparatus for connection of at least one energy storage pack. The electric power tool can be operated for a longer time or at higher power level. It is furthermore possible to utilize a proven and robust contact system, for example tulip contacts with insertion lugs.

BRIEF DESCRIPTION OF THE DRAWINGS

Exemplifying embodiments of the present invention are depicted in the figures. The figures, and the description below, contain numerous features in combination. One skilled in the art will appropriately also consider the features individually, and combine them into helpful further combinations.

DETAILED DESCRIPTION OF EXAMPLE EMBODIMENTS

Figure 1:
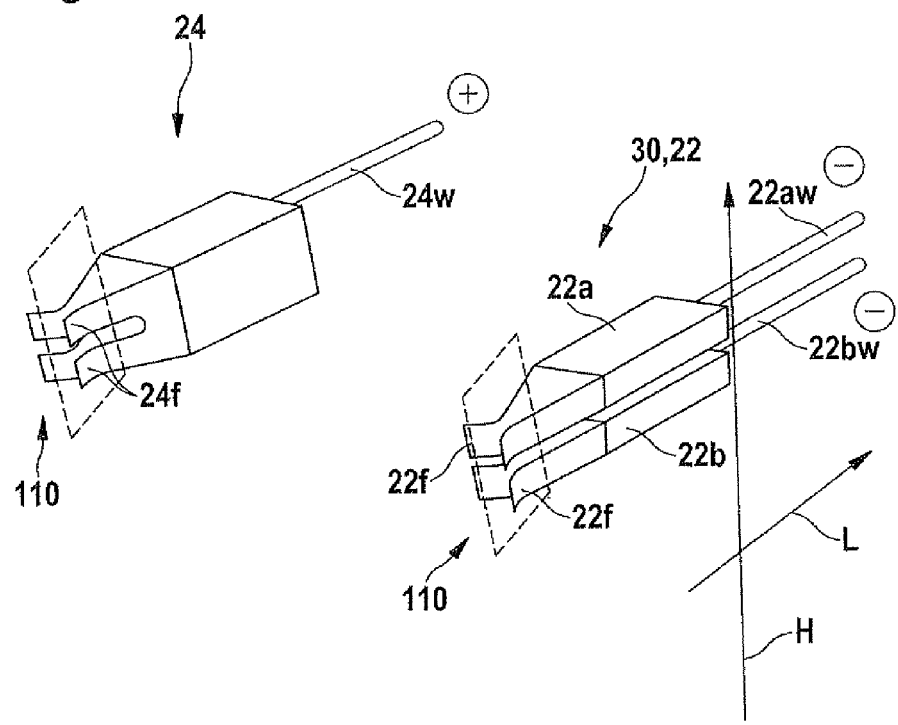
FIG. 1 is a view of an advantageous embodiment of two pole terminals of an energy storage pack according to the present invention, of which one pole terminal is embodied as a subassembly that encompasses two electrically separated contacts.

In the Figures, identical or similar components are labeled with identical reference characters.

Figure 2:
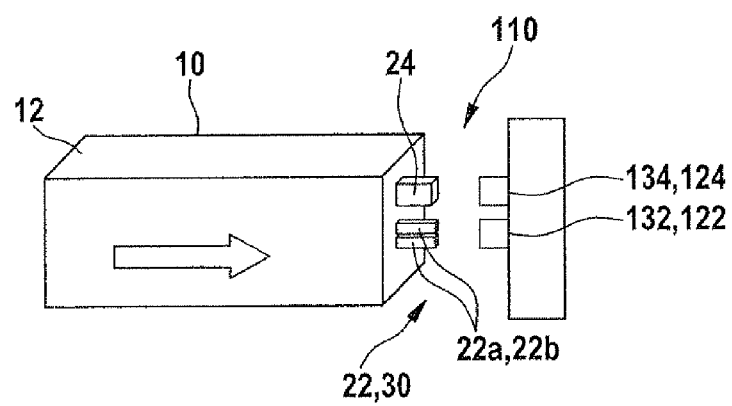
FIG. 2 shows an embodiment of a energy storage pack according to the present invention upon connection to complementary terminals.

FIG. 1 is a view of an advantageous example embodiment of two pole terminals 22, 24 of an energy storage pack (not discussed), e.g., a battery pack, according to the present invention, of which one pole terminal 22 is embodied as a subassembly 30 that encompasses two electrically separated contacts 22a, 22b. FIG. 2 shows an example embodiment of an energy storage pack 10 having said pole terminals 22, 24 upon connection to complementary terminals 122, 124 of a device (not described further), for example, an electric power tool or a charger.

Advantageously, pole terminals 22, 24 can be embodied as tulip contacts, having a longitudinal axis L and a vertical axis H, that have at their free end spring contact pairs 22f, 24f between which a respective complementary pole terminal 122, 124, for example a complementary contact tongue 132, 134, of a device can be gripped. In FIG. 1, the complementary terminals 122, 124 gripped between spring contact pairs 22f, 24f are not described in further detail and are merely indicated by dashed lines.

Contact tongue 132, 134 has, for example, a vertical axis parallel to vertical axis H. For that purpose, pole terminals 22, 24 and the complementary pole terminals 122, 124 are embodied, for example, as plug connectors of a plug/socket connection 110, so that contact tongue 132 is held securely by contact tongues 22f of the one pole terminal 22, and contact tongue 134 is held securely by contact tongues 24f of the other pole terminal 24.

In this exemplifying embodiment, the one pole terminal 22 is embodied as a subassembly 30 having two electrically separated contacts 22a, 22b, for example by the fact that the tulip contact is divided longitudinally. Contact 22a is connected by way of a lead 22aw to one pole of a first cell block having at least one electrochemical reservoir (not depicted). Contact 22b is connected by way of a lead 22bw to an identical-polarity pole of a further cell block having at least one electrochemical reservoir (not depicted). For example, contacts 22a, 22b are connected to the negative poles of the two cell blocks. The two opposite-polarity poles of the two cell blocks, for example the positive poles, are connected via a lead 24w to pole terminal 24. The height of contact tongues 132, 134 extends above the height of pole terminals 22, 24, so that contact tongues 132, 134 always come into electrical connection with all the spring contact pairs 22f, 24f, even when the contacts 22a, 22b of one or both pole terminals 22, 24 are electrically separated.

As a result of the separation of pole terminal 22 into two electrical contacts 22a, 22b, the latter are electrically connected when subassembly 30 is brought together with the complementary plug connector 132 or pole terminal 122, with the result that the two cell blocks are electrically connected in parallel. Assuming the individual cell blocks have the same energy density, the result is that once connection 110 has been created, the combination of the cell blocks makes available twice as much energy to pole terminals 22, 24 of energy storage pack 10. The running time of, for example, a connected electric power tool can thereby be extended. In addition, parallel discharge can result in less of a load on each individual cell block and thus less self-heating, so that the service life of energy storage pack 10, and of the cell blocks, can be increased. In addition, with parallel discharge a higher current can also be made available to the electric power tool than could be provided, in accordance with specifications, by an individual cell block.

Figure 3:
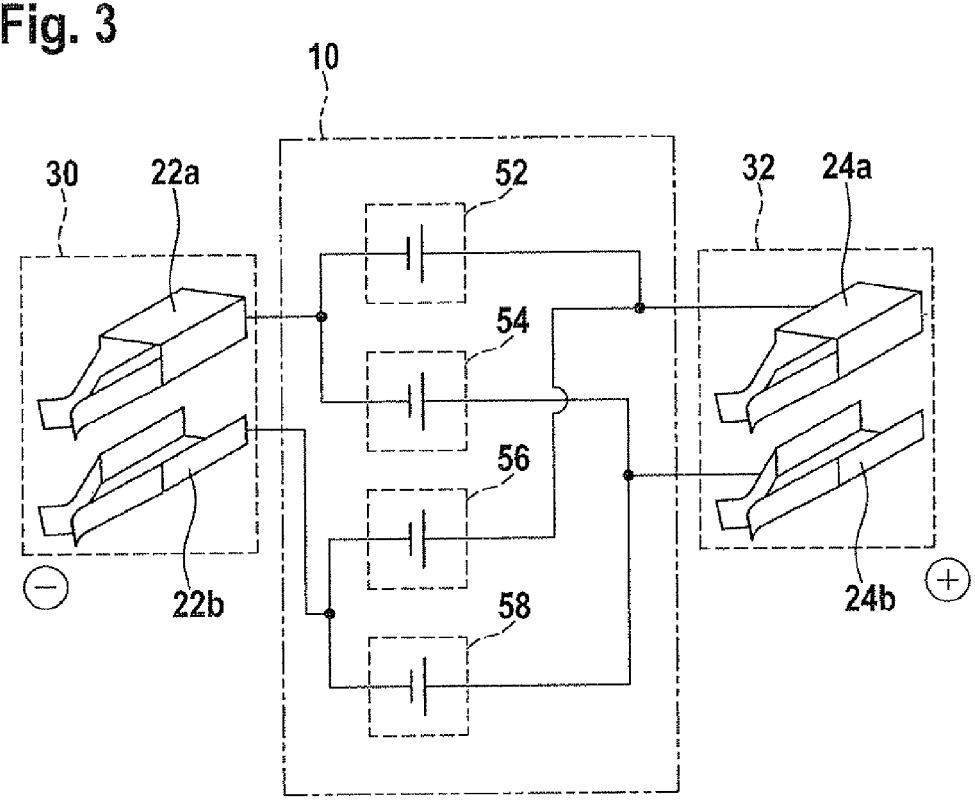
FIG. 3 shows an interconnected circuit of four cell blocks having two pole terminals, of which each pole terminal is embodied as a subassembly that encompasses two electrically separated contacts.
Figure 4:
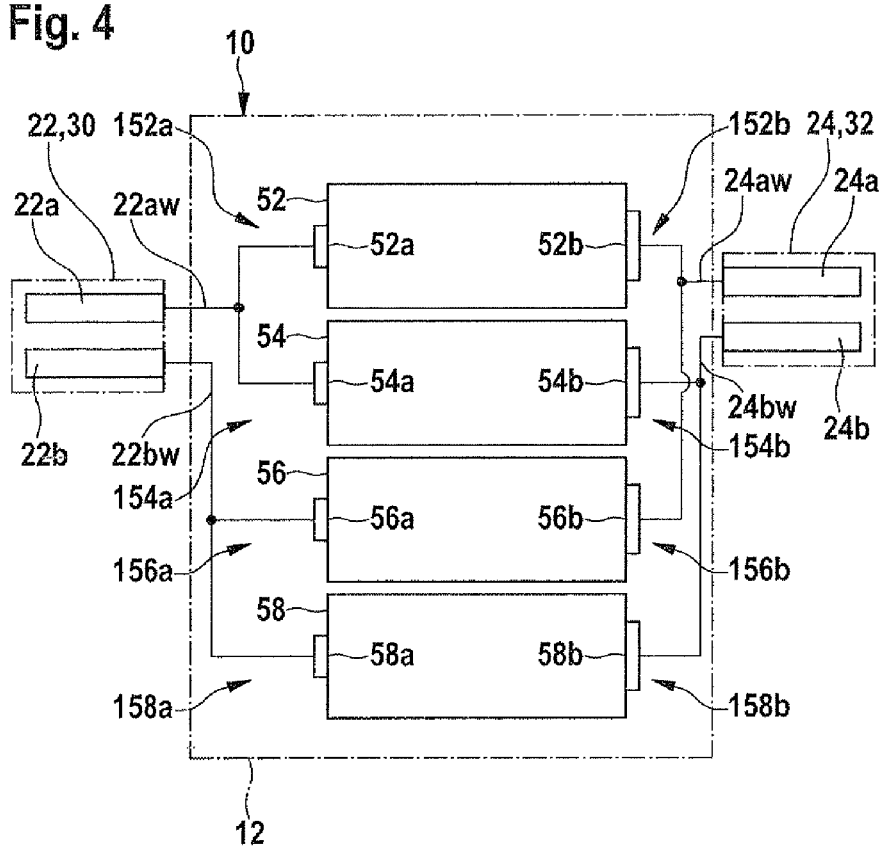
FIG. 4 is a depiction corresponding to FIG. 3, with four cell blocks in a housing having contact positions for the cell blocks.

FIG. 3 shows an interconnected circuit of four cell blocks 52, 54, 56, 58 in an energy storage pack 10 having two pole terminals 22, 24. Cell blocks 52, 54, 56, 58 are each made up of a plurality of electrochemical storage cells. The one pole terminal 22 of energy storage pack 10 is embodied as subassembly 30, and the other pole terminal 24 as subassembly 32. Subassembly 30 of pole terminal 22 encompasses two electrically separated contacts 22a, 22b, while subassembly 32 of pole terminal 24 encompasses two electrically separated contacts 24a, 24b. FIG. 4 is a depiction corresponding to the interconnected circuit in FIG. 3, having four cell blocks 52, 54, 56, 58 in a housing 12 having contact positions 152a, 154a, 156a, 158a, 152b, 154b, 156b, 158b for cell blocks 52, 54, 56, 58 and their respective poles 52a, 54a, 56a, 58a (for example, negative poles), and poles 52b, 54b, 56b, 58b (for example, positive poles).

Contacts 22a, 22b of the one pole terminal 22 are connected to identical-polarity poles 52a, 54a, 56a, 58a of cell blocks 52, 54, 56, 58, for example to the negative poles. Contacts 24a, 24b of second pole terminal 24 are connected to the opposite-polarity poles 52b, 54b, 56b, 58b of cell blocks 52, 54, 56, 58, for example to the positive poles.

When the mating contact is not connected, contact 22a is connected via cell block 52 to contact 24a and via cell block 54 to contact 24b, while contact 22b is connected via cell block 56 to contact 24a and via cell block 58 to contact 24b.

If an individual cell block provides, for example, 100 Wh, the interconnected circuit depicted can make available, by connecting cell blocks 52, 54, 56, 58 in parallel, up to 400 Wh in housing 12.

In housing 12 of energy storage pack 10, electrical connecting leads 22aw, 22bw, 24aw, 24bw extend from contact positions 152a, 154a, 156a, 158a, 152b, 154b, 156b, 158b for cell blocks 52, 54, 56, 58 and their respective pole terminals 52a, 54a, 56a, 58a and 52b, 54b, 56b, 58b to contacts 22a, 22b and 24a, 24b of pole terminals 22 and 24 on the outside of housing 12.

Housing 12 can be correspondingly embodied so that if necessary, individual cell blocks 52, 54, 56, 58, or all of them, can be exchanged. In the inserted state, cell blocks 52, 54, 56, 58 can coact, at contact positions 152a, 154a, 156a, 158a, 152b, 154b, 156b, 158b that are provided, with releasable electrical contacts that connect cell blocks 52, 54, 56, 58 via connecting leads 22aw, 22bw, 24aw, 24bw to the corresponding pole terminals 22, 24.

Advantageously, one or both subassemblies 30, 32 can also have more than two electrically separated contacts 22a, 22b and 24a, 24b respectively. The number of connectable cell blocks is calculated as the product of the number of electrically separated contacts of subassemblies 30, 32. The configuration of pole terminals 22, 24 as tulip contacts makes possible a particular simple splitting of pole terminals 22, 24 into two or more electrically separated contacts, since the tulip contacts can simply be divided longitudinally parallel to a longitudinal axis and/or a vertical axis, while a complementary mating contact, constituting a stable contact tongue, can easily be pushed together with all the spring contacts of the tulip contacts.

If each pole terminal 22, 24 is split, for example, into three contacts, nine cell blocks can be connected. In the case of a division into six contacts per pole terminal, thirty-six cell blocks can be connected, and so forth. Tulip contacts, in particular, can easily be divided. A longitudinal division parallel to a longitudinal axis is performed parallel to spring contact pairs in such a way that the (for example, horizontally disposed) spring contact pairs can enclose between them (as in FIGS. 1 to 4) a contact tongue (disposed, for example, vertically with respect thereto) of a complementary mating contact. Additionally or alternatively, it is also possible to divide the tulip contacts parallel to a vertical axis, so that a division extends parallel to the contact tongue of the complementary mating contact. Springs of a spring contact pair would then be electrically separated from one another provided they did not come into contact with the complementary mating contact. A separate cell block can be connected to each of the individual springs of a spring contact pair. It is thereby possible to drive even devices having a very high electrical consumption, such as electric scooters.

Figure 5:
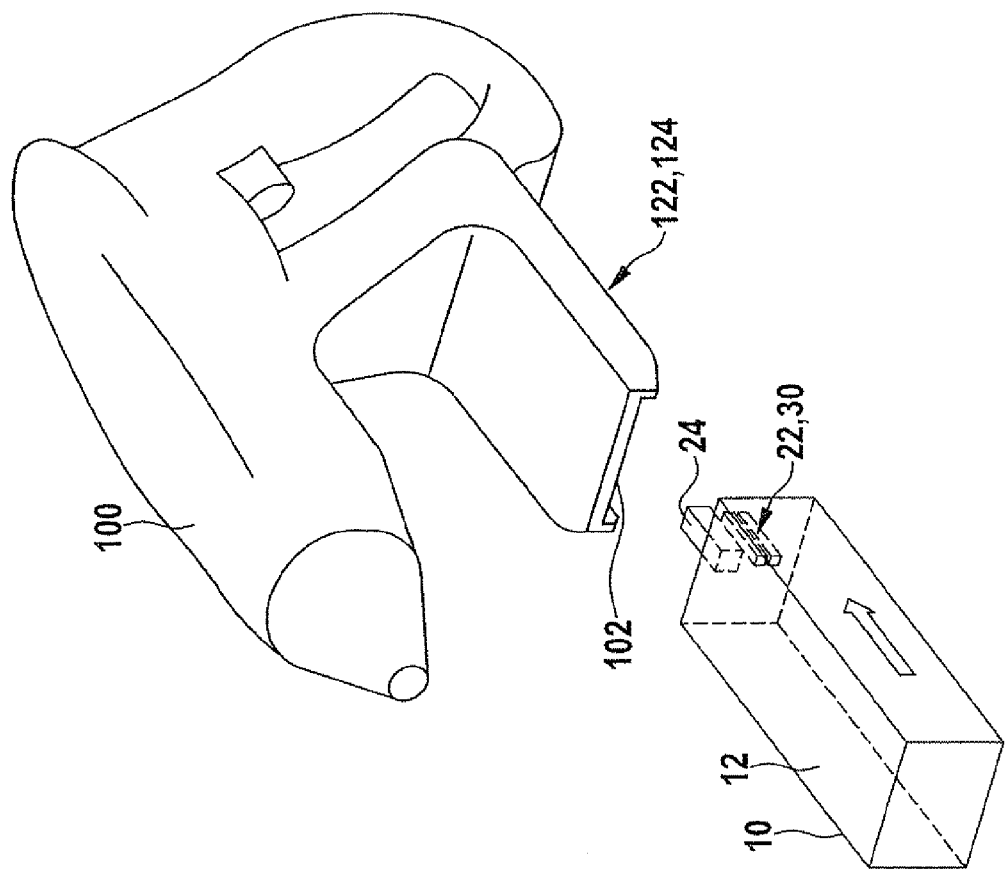
FIG. 5 shows, by way of example, an electric power tool being connected to an energy storage pack.

FIG. 5 shows, by way of example, an electric power tool 100 being connected to an energy storage pack 10. Energy storage pack 10 can be slid into a receptacle 102 in which the complementary pole terminals 122, 124 of electric power tool 100, for connecting pole terminals 22, 24 of energy storage pack 10, are provided. In the exemplifying embodiment shown, energy storage pack 10 corresponds to the embodiment depicted in FIG. 2, having only one pole terminal 22 that is embodied as a subassembly 30 having two electrically separated contacts 22a, 22b.

What is claimed is:

1. An energy storage pack for an electric power tool, comprising:
a housing including a plurality of cell blocks, wherein each cell block has a plurality of electrochemical storage cells and a positive pole contact and a negative pole contact;
wherein the housing further includes a positive electrical pole terminal and a negative electrical pole terminal to which the positive pole contact and the negative pole contact of each cell block are electrically connectable;
wherein one of the positive and or negative pole terminal is divided into at least two electrically separated contacts which form a subassembly of the positive or negative pole terminal such that there are more contacts than pole terminals;
wherein each contact of the positive or negative pole terminal is electrically connected to the other of the positive or negative pole terminal via one of the plurality of cell blocks and each of the positive and negative pole contacts of the cell blocks is electrically connected to one contact of the positive or negative pole terminal.

2. The energy storage pack as recited in claim 1, wherein the subassembly is electrically connectable when connected as intended to a complementary pole terminal.

3. The energy storage pack as recited in claim 1, wherein the subassembly is a plug connector of a plug and socket connection in such a way that a socket connection is electrically connectable when connected as intended to the plug connector.

4. The energy storage pack as recited in claim 1, wherein the two pole terminals are each embodied as a subassembly, each subassembly encompassing at least two electrically separated contacts.

5. The energy storage pack as recited in claim 4, wherein each contact of the subassembly is connected to at least two identical-polarity pole terminals of the cell blocks.

6. The energy storage pack as recited in claim 1, wherein the first and second pole terminals are tulip contacts.

7. The energy storage pack as recited in claim 6, wherein the tulip contacts are divided longitudinally parallel to at least one of a longitudinal axis and a vertical axis of the tulip contact.

8. An electric power tool having a contact apparatus for connection of at least one energy storage pack, the energy storage pack comprising:
a housing including a plurality of cell blocks, wherein each cell block has a plurality of electrochemical storage cells and a positive pole contact and a negative pole contact;
wherein the housing further includes a positive electrical pole terminal and a negative electrical pole terminal to which the positive pole contacts and the negative pole contacts of each cell block are electrically connectable;
wherein one of the positive or negative pole terminal is divided into two electrically separated contacts which form a subassembly of the positive or negative pole terminal such that there are more contacts than pole terminals;

wherein each contact of the positive or negative pole terminal is electrically connected to the other of the positive or negative pole terminal via one of the plurality of cell blocks and each of the positive and negative pole contacts of the cell blocks is electrically connected to one contact of the positive or negative pole terminal.

9. An energy storage pack for an electric power tool, comprising:

a housing including a plurality of cell blocks, wherein each cell block has a plurality of electrochemical storage cells and a positive pole contact and a negative pole contact;

wherein the housing further includes a positive electrical pole terminal and a negative electrical pole terminal to which the positive pole contacts and the negative pole contacts of each cell block are electrically connectable;

wherein the positive and negative pole terminals are each divided into at least two electrically separated contacts which form a subassembly of each positive and negative pole terminals such that there are more contacts than pole terminals;

wherein each contact of the positive or negative pole terminal is electrically connected to each contact of the other of the positive or negative pole terminal via one of the plurality of cell blocks and each of the positive and negative pole contacts of the cell blocks is electrically connected to one contact of the positive or negative pole terminal.

10. The energy storage pack as recited in claim 9, wherein the subassembly is electrically connectable when connected as intended to a complementary pole terminal.

11. The energy storage pack as recited in claim 9, wherein the first and second pole terminals are tulip contacts.

12. The energy storage pack as recited in claim 11, wherein the tulip contacts are divided longitudinally parallel to at least one of a longitudinal axis and a vertical axis of the tulip contact.

13. The energy storage pack as recited in claim 9, wherein the number of cell blocks is equal to a product of the number of electrically separated contacts of the positive pole terminal and the number of electrically separated contacts of the negative pole terminal.

14. The energy storage pack as recited in claim 4, wherein the number of cell blocks is equal to a product of the number of electrically separated contacts of the positive pole terminal and the number of electrically separated contacts of the negative pole terminal.

15. An energy storage pack for an electric power tool, comprising:

a housing for reception of a plurality of cell blocks having electrochemical storage cells and a first electrical pole terminal and a second electrical pole terminal to which positive poles and negative poles of the cell blocks are electrically connectable;

wherein at least one of the first and second pole terminals is divided into at least two electrically separated contacts which form a subassembly of the at least one of the first and second pole terminals such that there are more contacts than pole terminals, wherein the housing has two pole terminals that are each embodied as a subassembly, each subassembly encompassing at least two electrically separated contacts, wherein each contact of the subassembly is connected to at least two identical-polarity pole terminals of the cell blocks.

\* \* \* \* \*